(12) United States Patent
Quinn, Jr.

(10) Patent No.: US 11,037,259 B2
(45) Date of Patent: *Jun. 15, 2021

(54) PATENT LIFE CYCLE MANAGEMENT SYSTEM

(71) Applicant: ITIP Development, LLC, Lexington, MI (US)

(72) Inventor: Thomas F. Quinn, Jr., Lexington, MI (US)

(73) Assignee: ITIP Development, LLC, Lexington, MI (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/438,675

(22) Filed: Jun. 12, 2019

(65) Prior Publication Data

US 2019/0295201 A1 Sep. 26, 2019

Related U.S. Application Data

(63) Continuation of application No. 14/380,114, filed as application No. PCT/US2013/027343 on Feb. 22, 2013, now Pat. No. 10,380,707.

(60) Provisional application No. 61/603,119, filed on Feb. 24, 2012, provisional application No. 61/613,134, filed on Mar. 20, 2012.

(51) Int. Cl.
| | |
|---|---|
| *G06Q 50/18* | (2012.01) |
| *G06Q 10/06* | (2012.01) |
| *G06Q 10/00* | (2012.01) |
| *G06Q 30/04* | (2012.01) |

(52) U.S. Cl.
CPC .......... *G06Q 50/184* (2013.01); *G06Q 10/00* (2013.01); *G06Q 10/06* (2013.01); *G06Q 30/04* (2013.01); *G06Q 50/18* (2013.01)

(58) Field of Classification Search
CPC ...... G06Q 30/04; G06Q 50/18; G06Q 50/184; G06Q 10/00; G06Q 10/06
See application file for complete search history.

(56) References Cited

U.S. PATENT DOCUMENTS

| | | | |
|---|---|---|---|
| 5,175,681 A | 12/1992 | Iwai et al. | |
| 7,016,851 B1 | 3/2006 | Lee | |

(Continued)

FOREIGN PATENT DOCUMENTS

| | | |
|---|---|---|
| CN | 1489076 A | 4/2004 |
| EP | 1246074 A2 | 10/2002 |

(Continued)

OTHER PUBLICATIONS

Y. Terakawa (2007), "Patent Prosecution Highway, the whole new approaches—The outline of PPH and the result of the pilot program between the JPO and the USPTO," Patent, 2008, vol. 61, No. 2, pp. 26-34, with two pages of partial translation.

(Continued)

*Primary Examiner* — Scott S Trotter
(74) *Attorney, Agent, or Firm* — Price Heneveld LLP

(57) ABSTRACT

A method and system are provided for managing the cost and quality of international patent applications over the life cycle of such applications. The method and system have various process circuitries that generate instructions for administrative and technical tasks and generate communications between a controlling agent and both an administrative patent agent and a technical agent.

15 Claims, 3 Drawing Sheets

(56) References Cited

U.S. PATENT DOCUMENTS

| | | |
|---|---|---|
| 7,386,460 B1 | 6/2008 | Frank et al. |
| 7,574,367 B2 | 8/2009 | Lee |
| 7,634,415 B2 | 12/2009 | Baker et al. |
| 7,650,288 B2 | 1/2010 | Lee |
| 2002/0059076 A1 | 5/2002 | Grainger et al. |
| 2002/0091542 A1 | 7/2002 | Grainger |
| 2002/0111824 A1 | 8/2002 | Grainger |
| 2002/0111953 A1 | 8/2002 | Snyder |
| 2002/0138297 A1 | 9/2002 | Lee |
| 2002/0161733 A1 | 10/2002 | Grainger |
| 2003/0093292 A1 | 5/2003 | Ohkawa |
| 2003/0105738 A1 | 6/2003 | Taketa et al. |
| 2003/0112270 A1 | 6/2003 | Newell et al. |
| 2003/0172020 A1 | 9/2003 | Davies et al. |
| 2003/0210249 A1 | 11/2003 | Simske |
| 2004/0030673 A1 | 2/2004 | Simpson |
| 2004/0044688 A1 | 3/2004 | Brudz et al. |
| 2004/0236621 A1 | 11/2004 | Eder |
| 2005/0038683 A1 | 2/2005 | Leem |
| 2005/0210009 A1 | 9/2005 | Tran |
| 2006/0085220 A1 | 4/2006 | Frank et al. |
| 2006/0173703 A1 | 8/2006 | Lee |
| 2007/0250364 A1 | 10/2007 | Lundberg et al. |
| 2008/0046862 A1 | 2/2008 | Sattler et al. |
| 2008/0147470 A1* | 6/2008 | Johri ............... G06Q 10/06 379/265.11 |
| 2009/0037247 A1 | 2/2009 | Quinn |
| 2009/0182671 A1 | 7/2009 | Kloppers |
| 2009/0271425 A1 | 10/2009 | Le Gall et al. |
| 2009/0307577 A1 | 12/2009 | Lee |
| 2009/0327005 A1 | 12/2009 | Lee |
| 2010/0223108 A1 | 9/2010 | Quinn, Jr. |
| 2010/0223557 A1 | 9/2010 | Kenney et al. |
| 2012/0036077 A1 | 2/2012 | Quinn, Jr. |
| 2013/0060709 A1 | 3/2013 | Quinn, Jr. |

FOREIGN PATENT DOCUMENTS

| | | |
|---|---|---|
| JP | 2001325411 A | 11/2001 |
| JP | J003196444 A | 7/2003 |
| JP | 2003233713 A | 8/2003 |
| JP | 2010044655 A | 2/2010 |
| KR | 1020000059006 | 10/2000 |
| KR | 1020040106619 | 12/2004 |
| WO | 2001097100 A1 | 12/2001 |
| WO | 2002037344 A1 | 5/2002 |
| WO | 03048997 A1 | 6/2003 |
| WO | 2006116818 A1 | 11/2006 |
| WO | 2007109503 A2 | 9/2007 |
| WO | 2009052092 A1 | 4/2009 |
| WO | 2012034172 A1 | 3/2012 |

OTHER PUBLICATIONS

Web pages retrieved from http:/linguist.com/ using Internet archive, WayBackMachine, having a publication date of Oct. 2008 (hereinafter referred to as Linguistics).

"Introduction to Stored Procedure in MySQL," [online], archived on Jul. 2, 2008, available at: https://web.archive.org/web/20080702040546/http://www.mysqltutoriatorg:80/introduction-to-sql-stored-procedures.aspx (Year:2008).

* cited by examiner

REQUEST FOR EXAM PAPERWORK DUE DATE

REPORT DATE: 2/23/2012

| CLIENT FILE | COUNTRY | FILING TYPE | DEADLINE | DAYS REMAINING |
|---|---|---|---|---|
| BB-05824-CN | CN | PCT NATIONAL | 2/24/2012 | 1 |
| RR-9111-CA | CA | PCT NATIONAL | 2/24/2012 | 1 |
| RR-9112-CA | CA | PCT NATIONAL | 2/24/2012 | 1 |
| Z8471 AR | AR | NATIONAL REGULAR | 2/25/2012 | 2 |
| Z38471 GC | GC | NATIONAL REGULAR | 2/25/2012 | 2 |
| Z38471 TW | TW | NATIONAL REGULAR | 2/25/2012 | 2 |
| Z4304 AR | AR | NATIONAL REGULAR | 2/25/2012 | 2 |
| Z4304 GC | GC | NATIONAL REGULAR | 2/25/2012 | 2 |
| Z4304 TW | TW | NATIONAL REGULAR | 2/25/2012 | 2 |

FIGURE 3

PATENT LIFE CYCLE MANAGEMENT SYSTEM

CROSS-REFERENCE TO RELATED APPLICATIONS

This patent application is a continuation of U.S. patent application Ser. No. 14/380,114, filed Aug. 21, 2014, and entitled "Patent Life Cycle Management System," now U.S. Pat. No. 10,380,707, which is the 371 National Stage of International Application No. PCT/US2013/027343 filed Feb. 22, 2013 which claims the benefit of priority to U.S. Provisional Patent Application Nos. 61/603,119, filed Feb. 24, 2012, and entitled, "Patent Life Cycle Management System"; and 61/613,134, filed Mar. 20, 2012, and entitled, "Patent Life Cycle Management System", which are incorporated in their entireties herein by this reference.

FIELD OF THE INVENTION

The present invention generally relates to managing the life cycle of patent applications, and more particularly relates to a system and method for an agent to manage the cost and quality of related international patent applications.

BACKGROUND AND SUMMARY OF THE INVENTION

Global economic concerns have caused technology based companies to become more cost conscience and set cost savings goals. While technology companies are doing everything they can to reduce costs, they still wish to obtain strategic international patent protection without compromising the quality of their patent portfolio. Unfortunately, balancing these two objectives has been very difficult to do without the proper systems necessary to achieve both.

International patent prosecution has historically been complex and costly. Countries having a patent office have their own unique laws, rules and regulations that can be difficult to understand and are constantly changing. As such, it can be difficult for those not practicing in a country to understand the attorney services and the cost structure associated with these services. Moreover, patent attorneys are judged within their law firms by the amount of billings they generate and therefore have traditionally had little incentive to aid their clients in understanding the tasks they perform or the cost structure associated with such tasks.

International applicants desire coordinated prosecution of related international patent applications, including international claim strategies, to ensure consistent claims in all countries. This coordination is typically done by a "controlling agent" such as the agent that prepared the application, a "drafting agent", and/or an agent that works for the applicant, an "in-house agent". Such coordinated prosecution is difficult to manage and expensive when an application is filed in multiple countries, in multiple languages. A large amount of correspondence is required and translation of such correspondence is often required, causing international prosecution to be expensive and confusing at times.

In addition, during international prosecution there are numerous intellectual property or "IP" prosecution tasks that occur over an extended period of time in each country, making it difficult for the controlling agent to determine whether each task is a technical task to be handled by IP professionals or an administrative task that can be handled by paraprofessionals or IP associates at much lower rates. As such, it is almost impossible to determine the cost structure of all such tasks around the world and effectively manage them. Some administrative IP tasks have been identified and handled by legal process outsourcing agencies, e.g., annuity payments, translation and foreign filing. With the advent of the patent prosecution highway or "PPH", it is now possible for some patent applications to be granted by a patent office in one country based upon a patent office in another country granting substantially similar claims in a related application. As such, more and more international prosecution tasks are becoming administrative in nature, capable of being handled by paraprofessionals and associates at much lower rates.

To date, existing systems for managing intellectual property have focused on managing technical agents to perform administrative tasks. Inevitably, these systems fail to properly manage cost for a variety of reasons. First, multiple technical agents residing in multiple countries do not have the interactive capability or incentive to provide seamless efficient intellectual property services at a low cost. Second, legal process outsourcing companies, like patent translation companies, who do provide administrative legal services at administrative rates, are only focused on a single administrative task in the life cycle of an intellectual property asset. As such, technical agents can charge for "new" services being provided immediately before or after the administrative task being performed by the legal process outsourcing company. This can quickly eliminate any savings provided by the legal process outsourcing company. For example, a translation company may provide translations at a lower rate than technical agents, however, if an agent loses its translation work to a translation company, the agent will often begin to charge for new services described as "sending documents to the translation company" or "checking the translation provided by the translation company". Moreover, e-billing systems gather data on such intellectual property costs for analysis by in-house counsel, but do not provide a system for preventing such new charges, nor do they provide a system for efficiently utilizing administrative agents for administrative tasks and technical agents for technical tasks.

The system of the present invention introduces a completely new concept in the management of intellectual property over its life cycle. Rather than attempting to manage technical agents to perform administrative tasks, or using a legal process outsourcing company for a single administrative task in the life cycle, a system is provided that breaks down and identifies all tasks in the intellectual property life cycle as administrative tasks or technical tasks. The system then provides a user with a choice of using an administrative agent for administrative tasks or a technical agent for technical tasks throughout the entire intellectual property life cycle. In other words, the present invention allows a single controlling agent familiar with the invention to manage the prosecution of multiple related international patent applications without employing expensive technically qualified agents for all tasks.

Various process circuitries in the system are utilized to perform tasks which may include docketing, generating automated instructions for such tasks, tracking the progress of tasks to ensure timely completion, generating automated reports and reminders relating to tasks, assisting with the completions of certain tasks and/or paying the agents for tasks completed by both administrative and technically qualified agents. In the system, low fixed charges can be established for repetitive administrative tasks, and budgets or fixed fees can be established for technical tasks requiring a technically qualified agent.

With the assistance of the system of the present invention, a controlling agent who is not familiar with the nature of all tasks in the international IP prosecution life cycle and the costs associated therewith can control such costs by controlling the agents performing each task and/or their charges associated with such tasks. The system provides the controlling agent with a choice of instructing a separate administrative agent to handle an administrative task at a lower cost and the controlling agent can also instruct another more technically qualified agent to perform technical tasks.

As such, less expensive administrative agents can be used for non-technical work, such as filing the application, reporting correspondence, requesting exam, filing a PPH request, correcting formalities, paying a grant fee, proofreading, paying an annuity fee, recording assignments, filing paperwork, etc., while technically qualified agents can be used for more expensive technical work, such as analyzing the prior art in a search report and responding to office actions with rejections based upon prior art. If technical work is required by a technically qualified agent, a budget can be included in the system and incorporated into an instruction from the controlling agent.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a docketing and reminder report generated by the system, according to one embodiment.

DETAILED DESCRIPTION OF THE PREFERRED EMBODIMENTS

Various aspects of the system and method of the present invention disclosed herein, along with the accompanying drawings referenced herein, are intended to be exemplary and not limiting. It is understood that other embodiments may be utilized and fall within the scope of the appended claims without departing from the spirit of the invention.

Disclosed is a method and system for an attorney familiar with an invention, such as a drafting attorney, to control international prosecution costs while maintaining quality and executing an international patent strategy that provides consistent international claims.

Figure 1:
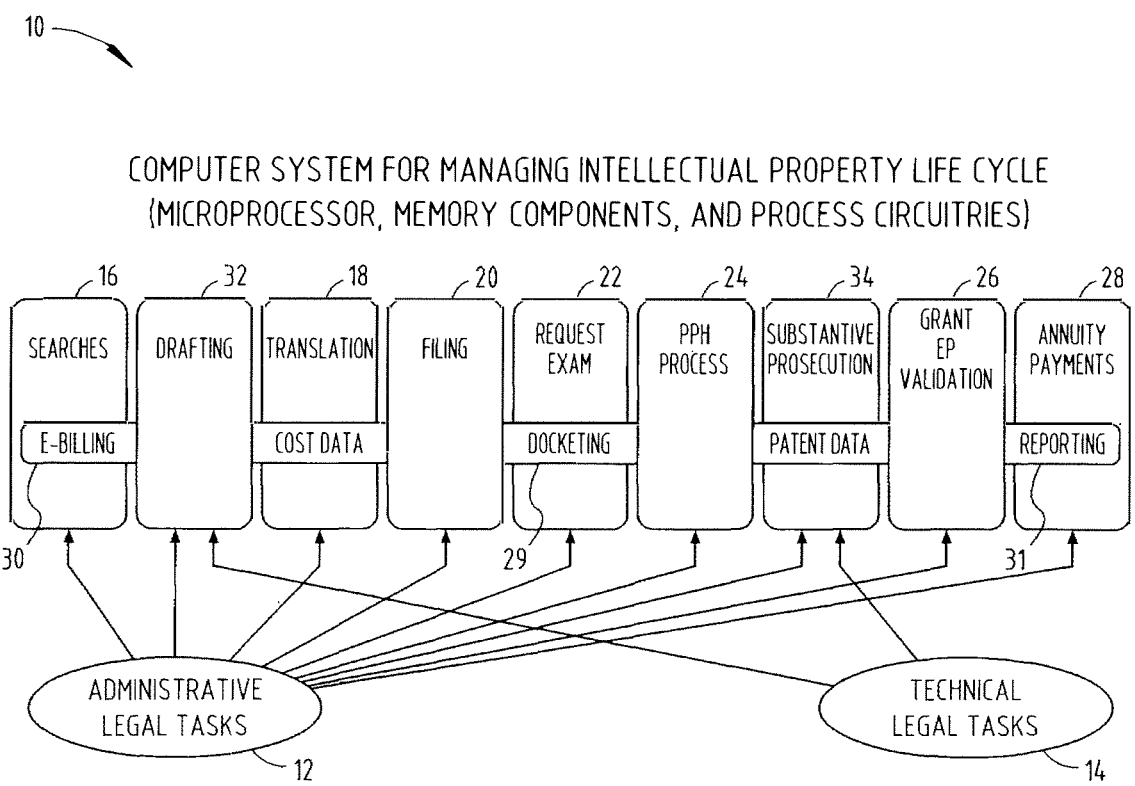
FIG. 1 is a diagram showing a system for managing administrative and technical tasks throughout the life cycle of a patent application.

In its simplest form, the present invention is a method of controlling the cost of acquiring international IP protection. The method comprises first determining which tasks in the process of acquiring international IP protection are administrative and which are technical, as shown in FIG. 1. Next, at least one of the administrative tasks is assigned to an administrative agent at a rate lower than the technical agent charges and, optionally, at a flat fixed fee. In one aspect of the present invention, the administrative tasks comprise conducting a novelty search, translating a patent application, filing international patent applications, requesting examination, filing a request for grant under the PPH, correcting formalities, paying a grant fee, validating a granted application in multiple patent offices, proofreading the granted application, paying annuity fees, auditing charges for such tasks and other miscellaneous administrative tasks such as recording assignments, filing declarations, docketing patent application data, processing invoice data, and the like.

In another embodiment, the present invention comprises a system 10 comprising a computer having a microprocessor and memory components for executing process circuitries and for storing data to manage the selected tasks in the lifecycle of an IP asset.

As used in the present invention the term "system" is the computer based system having various control circuitries used to manage the patent life cycle as detailed in this invention. A "controlling agent" means an agent that is familiar with an invention and has management responsibility for insuring that process steps associated with international prosecution are completed. The controlling agent can be, for example, an agent or specialist in the patent owning organization or a patent agent outside said organization such as a drafting agent. The controlling agent can be assisted by a "controlling administrator" under supervision of the controlling agent. The term "drafting agent" means an agent responsible for drafting a priority application. The drafting agent can be an agent or specialist in the organization that owns the patent application or a patent agent or specialist outside the organization. The term "priority application" means the first filed application in a family of patent applications and an application on which the priority date of the claimed subject matter is established. The term "foreign agent" means an agent responsible for filing and/or prosecuting and/or managing a patent application in a country different than the country in which the priority application is filed or, alternatively, an agent in the same country who files a different type of application than the priority application. For example, a drafting agent may file a provisional application in the United States as a priority application and a "foreign agent" may convert the priority application into a regular utility application or an international PCT application. An "administrative task" is a task that can be performed by an individual that bills at a lower rate than a technical agent such as an administrator, paraprofessional, an administrative agent or associate, or a cost effective process such as a computer and/or software. Typically, these administrative tasks can be billed at a flat or fixed fee structure since the service is relatively repetitive and the level of effort is generally similar from case to case. These include translation of the application, filing the application, reporting correspondence, correcting formalities, filling forms, proofreading, recording assignments, filing paperwork, docketing, requesting substantive examination, filing a request for the patent prosecution highway and responding to non-substantive issues related thereto, activities related to grant, payment of grant fees, validation of patents in contracting countries within a regional patent office (e.g., validating in specific countries of the EPO) and the payment of annuities. An "administrative agent" is generally someone that performs primarily administrative tasks. This may include a legal process outsourcing company or LPO. Such agents may be one or more agents in one or more countries, each specializing in specific administrative tasks. The administrative agents may be selected by the owning organization, the controlling agent, a service separate from the controlling agent or any other appropriate means. A "technical task" is a task that is generally performed primarily by an individual that is both an agent and familiar with the technical contents of the application and/or the technology of the application including drafting the application, analyzing the prior art in a search report and responding to office actions. A "technical agent" is an agent that generally performs primarily technical tasks. The "owning entity" is the entity that owns at least a portion of the intellectual property (invention, application and/or patent).

One of the keys to a good international patent strategy is having a controlling agent familiar with the invention that can coordinate the prosecution of all related patent applications in foreign countries. Traditionally, the role of the controlling agent is time consuming and expensive due to the large amount of correspondence required between the controlling agent and the foreign agents and, often, the foreign agent's lack of knowledge. Many times translations are required and work on the same patent application in multiple countries is quite often redundant.

With the advent of new cooperative agreements between countries such as the patent prosecution highway, or "PPH", an agent can prosecute a patent application in their local patent office and, upon grant, request the cooperating countries' patent offices, via a foreign agent, to also grant the application with claims substantially similar to those claims originally granted in the agent's local patent office. In effect, this eliminates many of the duplicative and/or technical tasks associated with patent prosecution in the cooperating countries and, thus, saves cost on foreign prosecution. Unfortunately cost savings is not necessarily achieved given the various fee structures of foreign agents.

In order to employ PPH practice, the patent application must still be translated and filed in all desired countries, some prosecution steps such as requesting exam may be required, use of the PPH process must be requested and all tasks associated with the grant of a patent application must be performed. As such, the cost structure of a foreign patent's life cycle of services by foreign agents can still be confusing and ultimately very expensive. Accordingly, the present invention offers a novel method and computer based system that assists the controlling agent in managing such costs as follows.

One strategy for controlling the life cycle of foreign agent service fees is to understand the nature of the tasks being performed in order to determine whether such tasks are administrative or technical in nature. Historically, this has been problematic because it is difficult for the controlling agent to understand all the tasks associated with foreign patent practice in all countries. As such, foreign agents have often been able to charge attorney rates for all tasks, whether administrative or technical. To overcome these issues, the method and system of the present invention assist the controlling agent to manage these costs by providing various steps and/or process circuitry that differentiates the life cycle of patent tasks into administrative tasks and technical tasks. This allows the controlling agent to efficiently manage all or a desired portion of the tasks in the life cycle while insuring that the foreign agent's administrative tasks are handled in a more automated, efficient and, hence, cost effective manner. In addition, the system gives the controlling agent an option to use less expensive administrative agents to perform these administrative legal tasks, rather than a more expensive technical agent. By using this invention, therefore, the controlling agent doesn't have to be completely familiar with every aspect of the foreign prosecution in many countries to provide lower cost options for performing many such administrative tasks.

One example of the breakdown of tasks into administrative tasks 12 and substantive, technical tasks 14 is set forth in FIG. 1. As can be seen in this Figure, the system 10 includes process circuitries for managing administrative tasks 12 such as searching 16 translation 18, filing 20, requesting exam 22, filing for a patent prosecution highway request 24, activities related to grant 26 and the payment of annuities 28, which are all substantially administrative. In addition, process circuitries are provided for docketing activities such as entering patent application data 29, and e-billing activities such as entering cost data, etc. 30, as well reporting activities on such patent application data, cost data and other data as described herein 31, and these process circuitries 29, 30 and 31 apply to and are used to manage each of the administrative and substantive tasks 12 and 14 undertaken throughout the intellectual property life cycle. Tasks such as drafting the application 32 and substantive patent prosecution 34 clearly require technically skilled agents that understand the invention. Because administrative tasks 12 should be billed at rates substantially lower than technical tasks 14, and often at flat fees, the magnitude of the savings that are possible by such distinction and using the process of this invention are evident.

The system 10 of the present invention is a computer based system that has various control process circuitries 16, 18, 20, 22, 24, 26, 28, 29, 30, 31, 32 and 34 as shown in FIG. 1. This system has a conventional computer having a microprocessor and memory. It should be appreciated that any analog and/or digital control circuitry may be employed to process the data, execute one or more routines, and handle communication with each of the agents and any other service providers. Memory may include volatile and/or non-volatile memory including, but not limited to, random access memory (RAM), read-only memory (ROM), electronically erasable programmable read-only memory (EEPROM), flash memory and other known memory storage mediums.

Figure 2:
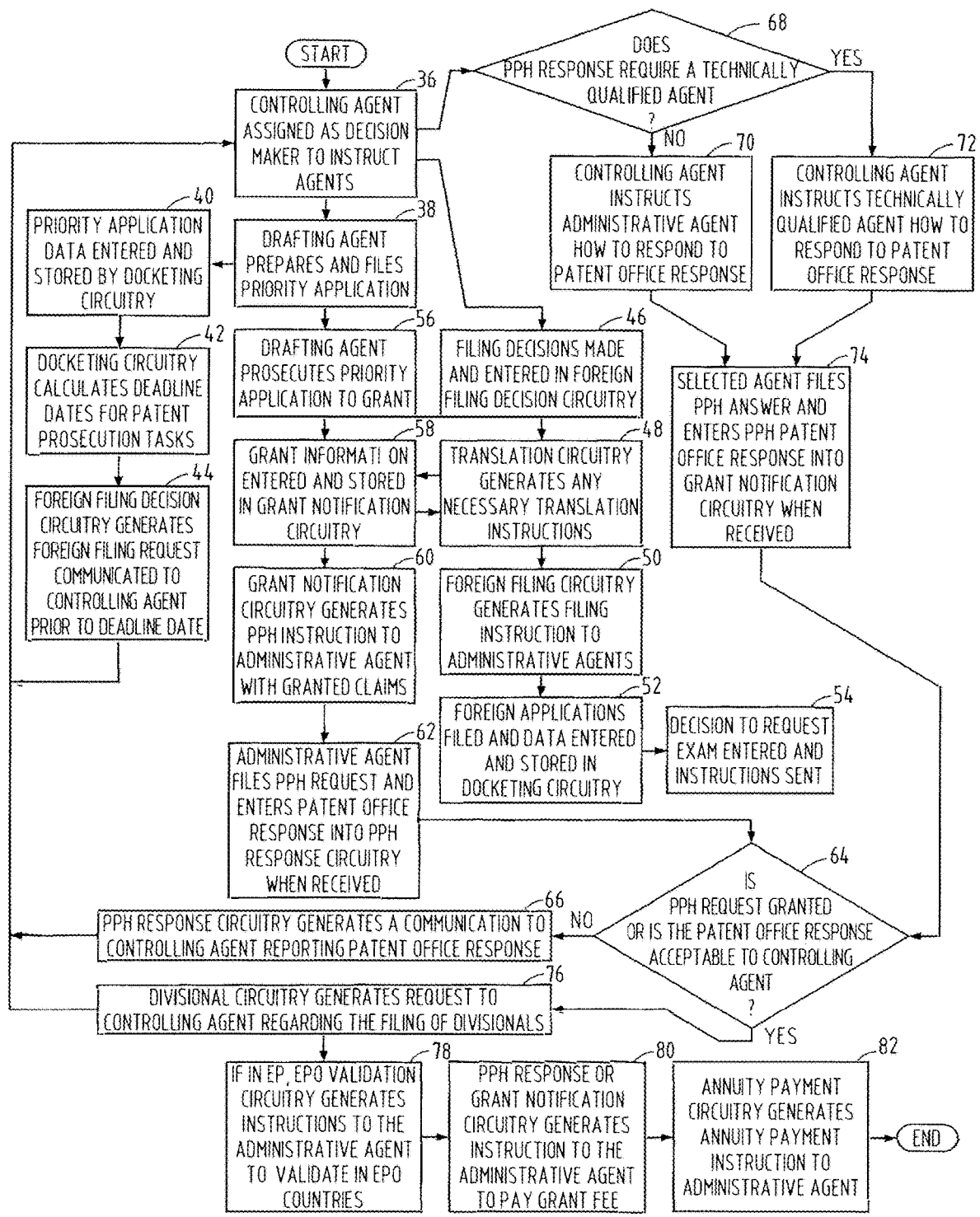
FIG. 2 is a block/flow diagram illustrating a system for managing the cost and quality for the life cycle of a patent application, according to one embodiment.

As shown in FIG. 2, an early step in one embodiment of the invention comprises assigning a controlling agent as a decision maker 36. Another early step in the intellectual property life cycle is a drafting agent preparing and filing a priority application 38. This step 38 is primarily technical legal work and the drafting agent becomes familiar with the invention, the technology and the art while performing such work. As such, the drafting agent, in consultation with the patent owning entity, is in a good position to carry out an international patent claiming strategy for the application they prepared.

If desired, prior to the drafting agent preparing and filing a priority application, the controlling agent or a designee such as a legal process outsourcing service can open a record in the system 10, which may comprise a database. This can simply be a record of the invention containing pertinent patent application data loaded into the system (e.g. invention date, title, inventors, description, etc.) or it can be, for example, a more complete invention disclosure containing data such as a description of the invention, figures, examples and the like. If desired, the invention disclosure record or parts thereof can be data entered in the system for prioritization of the intellectual property asset in the owning entity by, for example, data relating to the applicable business unit, technology, internal contact, patent management committees, and the like. Similarly, data within the invention disclosure record or parts thereof can be used for creating or included in instructions to various agents or other service providers, such as filing or other instructions. This can, for example, be an automated process that happens by simple key strokes or other commands in the system or it can be by giving the drafting agent access to the system.

In one embodiment of the invention, the record of the invention is created in a database which manages the entire life cycle of the intellectual property asset. This invention disclosure record can, for example, thereby be relationally linked to the later records in the IP life cycle such as the priority filing records, data and documents (e.g., prosecution documents), international filing records, data and documents (e.g., prosecution documents), annuity records and the like. Similarly, records of, for example, any prior art search and its graphic representations can be saved in the database and, if desired, the prior art search can be linked to the invention disclosure record as well as any prior art disclosures (e.g., USPTO 1449) that are necessary in some patent offices. Similarly, the database can link with, for example, commercial data such as marketing strategies, sales plans, actual sales of products covered by the application/patent. The database can likewise be linked to other records related to the application or patent such as contracts or other matter management items (e.g., litigation). Finally, the database can either act as, or be linked to, billing software so the cost of obtaining the patents can be monitored, managed and, if desired, paid.

In one embodiment, the system of the invention can be a stand-alone system. In another embodiment of the invention, conventional docketing software may be incorporated in the system of the present invention, added to the system of the present invention or linked with the system of the present invention. In yet another embodiment of the present invention, conventional docketing software can be programmed to incorporate the system of the invention. Examples of conventional docketing systems include those provided by Master Data System provided by The Thomson Corporation located at 1 Station Pl, Stamford, Conn. and the legal matter management system offered by Computer Packages Inc. located at 414 Hungerford Drive, Rockville, Md. Still other examples of docketing software include those provided by Computer Patent Annuities, Inc of Alexandria, Va. (Memotech, Foundation IP), Patrix USA of Alexandria, Va., Lecorpio located at 5201 Great America Parkway, Suite 320 Santa Clara, Calif. 95054 and Anaqua located at 745 Boylston Street, Boston, Mass. 02116. In yet another embodiment, the system of the invention, the docketing software as described above can be linked to other software, hardware, databases and the like. For example, the system of the invention and/or the docketing software can be linked to patent offices around the world for, for example, collecting pertinent data, insuring accuracy of data in the docketing software, electronic communication with the offices and/or examiners therein, and the like. Similarly, the system of the invention and/or the docketing software can be linked to enterprise wide software such as SAP or localized software and or databases of the owning entity or their agents. Likewise, the system of the invention and/or the docketing software can be linked to invoicing systems which automatically track, collate and/or remit payments for services.

As shown in FIG. 2, in step 40 the priority patent data is entered and stored by the docketing process circuitry 29 into the system 10. The docketing process circuitry 29 stores information relating to the priority application such as a matter number, patent application type, title of the invention, inventors, budget information, patent application number, a priority date, a priority country of filing, eventually a grant date, granted claims, prosecution history, filing plans and the like. To be sure, however, the docketing process circuitry 29 can be used to store a wide array of information pertinent to, for example, the patent application, the invention, prior art, the owning entity, cost of IP procurement, prioritization of the application, valuation of the application, competitors and competitive products, licensing potential, and the like.

The docketing process circuitry 29 can then be executed to use this information and data, as well as that entered later in the life cycle to generate or automatically calculate deadline dates for various administrative and technical tasks 42 such as foreign filings, requests for examination, payment of grant fees, application proofreading, paying annuity fees, validating patent applications from regional patent offices (e.g., EPO), actions within the owning entity such as commitments to maintain the prosecution and/or granting of the patent application (e.g., patent management committee decisions) and the like. Moreover, reporting process circuitry 31 can be executed to automatically or manually generate reports that include the patent application information and/or the information described above as well as any deadline dates for tasks to be completed on the patent applications, as shown by way of example in FIG. 3. This enables a user of the system to track and manage tasks that are coming due.

In yet another embodiment of the invention, the system 10 of the present invention and/or docketing software can include an e-billing process circuitry 30 to receive invoice or cost data from administrative and/or technical agents. The e-billing process circuitry 30 can receive and store such invoice or cost data including but not limited to invoice numbers, invoice dates, matter numbers (e.g., that identify a patent application or patent), service type and expense type codes such as UTBMS codes, attorney information, hourly rates, agent fees, expenses, descriptions of services and expenses, service and expense dates, budget information, the responsible in-house counsel, the country in which the matter is pending, exchange rates, and the like. The e-billing process circuitry 30 can be executed to automatically or manually generate reports that include the above mentioned invoice or cost data. For example, charges for administrative and technical tasks can be summed and compared to a variety of criteria. Existing e-billing systems that could be integrated into the system of the present invention include those provided by TIPS Invoice Processing Systems, LLC, as disclosed in U.S. Patent Application Publication No. 2009/0037247 A1 entitled Method And System For Managing Legal Matters published on Feb. 5, 2009, and U.S. Patent Application Publication No. 2010/0223108 A1 entitled System And Method For Managing Legal Service Providers published on Sep. 2, 2010, which are hereby incorporated by reference, and also other e-billing systems such as those provided by DataCert Inc. located at 3040 Post Oak Blvd., Houston, Tex., Lexis Nexis' Examen Inc. located at 3831 N. Freeway Blvd., Sacramento, Calif., Serengeti Law 155 108 Ave NE, Suite 650, Bellevue, Wash. 98004, and TyMetrix located at 20 Church Street, Hartford, Conn. 06103-3220.

In another embodiment, a further step comprises making decisions about which countries the priority application should be filed in (foreign filing decisions). Typically these decisions are made by the owning entity by, for example, patent management committees. Once decided, data relating to the foreign filing decisions can be entered into the system and/or into any of the types of software described above by, for example, the owning entity, the controlling agent or a designee such as a legal outsourcing service or a drafting agent. The foreign filing decision data as well as other data relating to the priority application is then transmitted to the agents responsible for filing in the desired countries. This can, for example, be an automated process that happens upon certain conditions being met or by simple key strokes or other commands in the database or it can be by giving the agents access to the database. One skilled in the art would also recognize that foreign filing decisions could be communicated independently of the system of the invention.

In another embodiment of the invention, the software described above may be primarily managed by the owning entity, the controlling agent or the drafting agent. When the foreign filing decision is made, the entity controlling the software enters the international filing plan in a foreign filing decision circuitry 20. Entry of a command into the software after the plan is entered can communicate this plan to a legal process outsourcing (LPO) provider responsible for filing the application. The LPO performs the filing activities and hands the case over to a technical or administrative agent to handle the prosecution as described below. The LPO then either enters the relevant data into the software or communicates the information to the entity controlling the software.

As further shown in FIG. 2, in another embodiment of the invention a further step comprises executing a foreign filing decision process circuitry 20 to automatically or manually generate a request for foreign filing decisions 44. This request includes at least a portion of the data relating to the intellectual property asset previously entered 40 into the system 10 of the present invention. The request is then communicated back to the controlling agent or a designee as also shown in step 44. One of ordinary skill in the art would recognize that this foreign filing decision request could be provided by the drafting agent or an employee of the owning entity, or both. One skilled in the art would also recognize that foreign filing decisions could be made and communicated independently of the system of the invention. If this embodiment is used, the data is entered into the system and/or into any of the types of software as described above by the methods described above and communicated.

As shown in FIG. 2, the next step comprises making, entering and storing foreign filing decisions information 46 in the foreign filing decision process circuitry 20 of the system 10. This information may include, but is not limited to data such as the countries or patent offices where corresponding patent applications are to be filed, the technical agents and administrative agents to be used in such patent offices and the like.

Translation of documents from one language to another is often necessary as a step in the process of the invention. For example, patent applications often need to be translated for filing in other countries. If this is required, one step in the process of the invention is to execute translation process circuitry 18 to request and/or generate necessary translations 48 of any required documents from an entity responsible for the task. This can, for example, be an automated process that happens upon certain conditions being met or by simple key strokes or other commands in the database or it can be by giving the agents access to the database. One skilled in the art would also recognize that communication of a request for translation could be made independently of the system of the invention.

As shown in FIG. 1, the system of the present invention may also include a translation process circuitry 18. If a translation is required for the foreign filing instruction, the translation process circuitry 18 can be executed to automatically or manually generate any necessary translation instructions and communicate such instructions to a translation supplier 48. The translation instruction may include a fee instruction that limits the fee for such translation. Other foreign filing software may be incorporated into the present invention, such as that disclosed in U.S. Patent Application Publication No. 2012/0036077 A1, entitled System And Method For Filing Legal Documents, published on Feb. 9, 2012, which is hereby incorporated by reference. One skilled in the art would recognize that communication of the translation instructions could be performed independently of the system of the invention.

The foreign filing decision process circuitry 20 can then be executed to automatically or manually generate a filing instruction 50 to the administrative and/or technical agent, such instruction including at least a portion of the information entered in the system of the present invention. One skilled in the art would recognize that communication of the foreign filing decisions to the desired agents could be performed independently of the system 10 of the invention.

Once the applications are filed in the foreign country(s), the agent that performed the filing either enters the data related to the filing (e.g., country, date, application numbers, specification, drawing and the like) into system 10 by the docketing process circuitry 46 of the invention or transmits it to an alternative agent (e.g., an LPO) for entry 52. This information is often used in the system 10 to generate dates for future actions.

In another embodiment, a further step comprises making decisions about whether to request examination of the application in the countries requiring such a decision 52. Typically these decisions are made by the owning entity by, for example, patent management committees, or by the controlling agent or the drafting agent. Once decided, the decision is entered into the system and/or into any of the types of software as described above by, for example, the owning entity, the controlling agent or a designee such as a legal outsourcing service or a drafting agent. As further set forth in step 54, the data is then transmitted to the agents responsible for requesting examination in the desired counties. This can, for example, be an automated process that happens upon the existence of certain conditions, or by simple key strokes or other commands in the database, or it can be by giving the agents access to the database. One skilled in the art would also recognize that decisions about request for examinations could be communicated independently of the system of the invention.

In one embodiment of the invention, another step comprises executing a request for examination process circuitry 22 to generate an instruction 54 to an examination requesting administrative or technical agent to request examination and communicating the instruction to the administrative or technical agent. The instruction asks the agent to request exam and to enter any related information into the system or communicate the information to, for example, the owning entity, the controlling agent or a designee such as a legal outsourcing service or a drafting agent. The instructions for requesting examination may include a fee instruction limiting the fees that can be charged by the foreign agent requesting exam. In one embodiment, the request for exam is automatically instructed prior to a deadline date calculated by the docketing process circuitry 29. This allows the controlling agent to delay the cost of requesting exam until just prior to the applicable deadline date. One skilled in the art would recognize that communication of the request for exam could be performed independently of the system of the invention.

The capacity of the system of the invention to delay request for examination may allow the controlling agent to obtain an application grant prior to requesting examination in any other countries where the priority application was foreign filed. As such, a user of the system could defer requesting examination in all countries where the PPH process is available and then execute the PPH process circuitry as described below. If a request for exam is required as part of the PPH process or because a request for exam is due prior to an application grant, then a request for examination process circuitry can be executed as set forth above.

Patent applications are generally prosecuted by technical agents, unless the patent prosecution highway process is used successfully as described below. As further shown in FIG. 2, the technical agent prosecutes the priority application until a grant is obtained 56. Upon grant, in another embodiment of the invention, the grant data is entered into the system 58 by the grant notification process circuitry 26 and/or into any of the types of software as described above by, for example, the owning entity, the controlling agent, the foreign agent or a designee such as a legal outsourcing service or a drafting/technical agent.

In another embodiment of the invention, once a grant is obtained, either at the office of first filing (OFF) or the first office to grant, depending on national PPH laws, the owning entity or a designee can select whether to use the PPH process circuitry. Once decided, the decision is entered into the system and/or any of the types of software as described above by, for example, the owning entity, the controlling agent or a designee such as a legal outsourcing service or a drafting agent. Step 58 further allows the agent in the country of first grant to also enter other information, or provide such other information to a designee for entry, that may be necessary for PPH such as the set of granted claims, a translation of these claims, the office actions associated with grant, the PPH request forms, a claims chart, any translations of other information that may be necessary, or the like. Translation process circuitry 18 can be executed to generate any necessary translation instructions 48, and if acceptable, machine translations of the above information may be generated.

As further shown in FIG. 2, the grant notification process circuitry 26 can be executed to generate an instruction to a PPH administrative agent, including any applicable data such as granted claims, forms and information, instructing the responsible agents to request PPH in the desired counties 60. This can, for example, be an automated process that happens upon the existence of certain conditions, or by simple key strokes or other commands in the database or it can be by giving the agents access to the database. One skilled in the art would also recognize that decisions about request for PPH could be communicated independently of the system of the invention.

If PPH is available in a country, one embodiment of the invention comprises the administrative and/or technical agent receiving PPH instruction to file a PPH request and acting on this request by filing within the requirements of the local country's patent office. The agent who files the request typically receives a response to the filing, such as a notification of allowance or an office action from the local patent office. In step 62, the information from both the filing and the patent office response, the response data, is entered into the PPH response process circuitry 62 in the system 10 and/or any of the types of software as described above by, for example, the PPH filing agent, the owning entity, the controlling agent or a designee such as a legal outsourcing service or a drafting agent. One skilled in the art would recognize that instruction to request PPH could be performed independently of the system of the invention.

As shown in FIG. 2, the next step is to determine if the response to the PPH filing is that the patent office is willing to grant the claims as filed and/or whether the response from the patent office was acceptable to the controlling agent 64. If yes, the administrative and/or technical agent is instructed to pay the grant fees as requested by, for example, the controlling agent or its designee. If desired, the owning entity or its designee may be queried about whether this fee should be paid prior to payment. The instruction to the agent may include a fee instruction that limits the amount the agent can charge for paying the grant fee. Any other instructions that are necessary or desired for the grant of the case may also be included and these instructions can limit the fees associated with such tasks. This can include, for example, an instruction relating to proofreading and correcting typographical errors and the like in the patent application, an instruction regarding validation in one or more countries from a regional office (e.g. the EPO) and/or an instruction regarding future annuity payments. One skilled in the art would recognize that the above instruction to pay the grant fee could be performed independently of the system of the invention.

As further shown in step 64, if the patent office response to the above request for PPH is a decision not to grant the claims as filed under the PPH, the PPH response process circuitry 24 generates a communication reporting the response back to the controlling agent 66 or a designee, which may include the reasons for failure to grant and appropriate documents. These reasons for failure to grant and the appropriate documents may be entered into the system 10 and/or any of the types of software as described above by, for example, the PPH filing agent, the owning entity, the controlling agent or a designee such as a legal process outsourcing service or a drafting agent. The owning entity, controlling agent, a designee and/or the agent that filed the request may determine the reason for failure to grant and provide instructions for response.

As shown in step 68, if the reason for rejection is administrative such as claim formalities rejections, simple defects, or the like, the decision may be that a technical agent is not required and to instruct the PPH administrative agent to resolve the issues 70 and obtain the grant. As further shown in step 68, if the reason for failure to grant is substantive and a technical agent is required, the decision may be to refer the application to a more technically qualified agent who can handle the issues necessary to obtain the grant. If the case is to be transferred to a technical agent, the technical agent is notified and provided access to the information necessary to prosecute the application 72. Access to the information can be by simply providing the technical agent with copies of the information or granting access to the software. Whether by an administrative or technical agent, the selected agent files an answer to the PPH patent office response and enters the new patent office response into the grant notification process circuitry 26.

As shown in FIG. 2, the process then repeats itself beginning at step 64 until a patent office response is received that is acceptable to the controlling agent. During this prosecution, the administrative and/or technical agent can enter the information related to their prosecution activities into the system or any of the software as described above, or by providing the information to an entity that enters it for them. Once allowance is obtained, the above process for paying grant fees is initiated. One skilled in the art would recognize that communication of the request for the agent to respond to the office action and the request to pay the grant fee could be performed independently of the system of the invention.

In another embodiment of the invention, one step comprises an agent entering the first grant information in the system of the invention 58. A grant notification process circuitry 26 receives and stores this grant information 58 which may include a first grant country or patent office issuing the first grant, a first set of granted claims, the office actions associated with grant, a grant date or grant notification date, the grant or patent number, a response from in intellectual property office indicating that a claim is in condition for grant, and the like. The grant notification process circuitry can then be executed to automatically or manually generate an instruction to the controlling agent or designee, requesting that the appropriate information, data, forms and the like be prepared based upon the first granted claims and country requirements for submission as part of a PPH request. This can include, for example, the PPH request form, a claims chart which may be automatically or manually generated from the data entered, required prosecution documents, and the like.

If necessary, the translation process circuitry 18 can be executed to generate an instruction to the translation supplier to provide a translation of all required information 48 such as the granted claims or the claims chart, prosecution documents and the like. The translation instruction may include a fee instruction that limits the fee for such translation. Any translations prepared can then be entered into the system. The grant notification process circuitry 26 can also be executed to automatically or manually generate a patent prosecution highway instruction 60 that includes any country required information, data or forms such as the grant information, and any translated claims.

The grant notification process circuitry 26 can also be executed to automatically or manually communicate the patent prosecution highway instructions to an administrative agent in the countries where a corresponding application is pending and the patent prosecution highway process is available. These patent prosecution highway instructions may include a fee instruction that limits the charge an administrative agent can charge for requesting the local patent office to grant the patent prosecution highway claims. If necessary due to national law or process requirements, the patent prosecution highway instructions can alternatively be communicated as above to a technical agent or, if desired, both an administrative agent and a technical agent with appropriate instructions and limitations (e.g., fees) for each. One skilled in the art would recognize that communication of the request for PPH could be performed independently of the system of the invention.

If PPH is available in a country, one embodiment of the invention comprises the administrative and/or technical agent receiving a PPH instruction to file a PPH request within the requirements of the local country's patent office. If necessary, an administrative agent or the controlling agent may refer any substantive issues such as claim drafting and/or amendment to a technical agent. As shown in step 62, after filing the PPH request, the agent who filed the request typically receives a response, such as a notification of allowance or an office action from the local patent office, and the data relating to the PPH filing and the patent office response thereto is entered into the system 10 by the PPH response process circuitry 24.

As further shown in FIG. 2, step 64 queries whether the PPH request is granted or if the patent office response is acceptable to the controlling agent. If the response is that the patent office is willing to grant the claims as filed in the PPH request, the PPH response process circuitry 24 or grant notification process circuitry 26 can ultimately be executed to automatically or manually generate a payment instruction to the administrative and/or technical agent to pay the grant fees as shown in step 80 in advance of the grant fee payment deadline calculated by the docketing process circuitry 29. This payment instruction may include a fee instruction that limits the amount the agent can charge for paying the grant fee. Any necessary proof reading instructions can also be included along with the grant fee payment deadline and these instructions can limit the fees associated with proofreading and correcting typographical errors and the like in the patent application. One skilled in the art would recognize that the above instructions to file the PPH request and/or pay the grant fee could be performed independently of the system of the invention.

If the patent office response to the above request for PPH is a decision not to grant the claims as filed in the PPH request or is not acceptable to the controlling agent, the PPH response process circuitry can be executed to automatically or manually generate an answer instruction to the controlling agent, the administrative agent and/or the technical agent which includes at least a portion of the patent office response information 66 as shown in FIG. 2. The agent can then enter an instruction into the system on how to respond to or answer the foreign patent office response depending on whether a technically qualified agent is required as shown in step 68 of FIG. 2. This instruction can instruct the administrative agent to prepare and file an answer or response to the foreign patent office 70, or it can instruct a technical agent to prepare an answer or response to the office action if a more technical answer or response is required 72. As shown in step 74, whether by an administrative or technical agent, the selected agent files an answer to the patent office response and enters the new patent office response data into the system 10 by PPH response process circuitry.

As shown in FIG. 2, this process can repeat at step 64 until the patent office is willing to grant claims of a scope satisfactory to the controlling agent and/or owning entity. Once such claims are granted and information related to the granted claims is entered into the system and/or into any of the software systems as described above, the PPH response process circuitry 24 or grant notification process circuitry 26 can ultimately be executed to automatically or manually generate a payment instruction as shown in step 80 to the administrative and/or technical agent to pay the grant fees as above. One skilled in the art would recognize that communication of the request for the agent to respond to the office action and the request to pay the grant fee could be performed independently of the system of the invention.

Note, the e-billing process circuitry 30 can receive and store a response budget amount that can be included in the response instruction above. This budget amount can be set by the controlling agent or a designee of the controlling agent. Alternatively the budget amount can be selected by the controlling agent or the controlling agent's designee from bids submitted to the system by the technical or administrative agents. Each patent prosecution highway response instruction communicated by the PPH response process circuitry 24 can include such budget information in the form of an instruction that limits the charge to the budgeted amount for the responding agent to prepare and/or submit a response to the local patent office.

If PPH is not available or elected, the patent application may be prosecuted in each desired country by a technical agent when technical tasks are required, such as responding to office actions, or by an administrative agent when non-substantive tasks are required. The technical agent prosecutes until a grant is obtained. Upon grant, in another embodiment of the invention, the grant data is entered into the system 10 by the grant notification process circuitry 26 and/or into any of the types of software as described above by, for example, the owning entity, the controlling agent, a foreign agent or a designee such as a legal outsourcing service or a drafting/technical agent.

If PPH is not available or elected, one embodiment of the invention comprises executing a grant notification process circuitry 26 to automatically or manually generate an instruction to an administrative agent to pay the grant fees in advance of the grant fee payment deadline calculated by the docketing process circuitry 29. This instruction may include a fee instruction that limits the amount the agent can charge for paying the grant fee. As above, any necessary proof reading instructions and a grant fee payment deadline date can also be included and these instructions can limit the fees associated with proofreading and correcting typographical errors and the like in the patent application as above. In one embodiment, the grant notification process circuitry 26 automatically or manually generates such an instruction prior to a deadline date calculated by the docketing process circuitry 29. One skilled in the art would recognize that communication of the request to pay the grant fee could be performed independently of the system of the invention.

Once the grant fees are paid, the patent is granted and all the information related to the prior steps is captured in the system 10 and/or the types of software as described above. Thereafter, often the only remaining steps in the life of the granted patent is payment of annuities. Typically, the owning entity, the controlling agent or a designee makes a decision as to whether the patent is to be maintained at each interval when annuities (maintenance fees) are to be paid or at each interval desired. Once made, the annuity decision maker or a designee can utilize the annuity payment process circuitry 28 to communicate the decision as to whether or not to make the payment to the agent responsible for making the annuity payment as shown in step 82. The paying agent can be the owning entity, the controlling agent, the drafting agent, an administrative agent, a technical agent, a legal process outsource provider or the like. The communication can be, for example, an automated process that happens when certain conditions are met or by simple key strokes or other commands in the database or it can be by giving the agents access to the database. One skilled in the art would also recognize that decisions about paying maintenance fees could be communicated independently of the system of the invention.

Another embodiment of the invention comprises an annuity payment process circuitry 28 which can be executed to automatically or manually generate an annuity fee payment instruction as set forth in step 82 in advance of the annuity fee payment deadline calculated by the docketing process circuitry 29. This annuity fee payment instruction can include a fee instruction limiting the amount the agent can charge for paying the annuity. One skilled in the art would recognize that the annuity fee payment instructions could be performed independently of the system of the invention.

Occasionally, additional steps are necessary in the life of patent applications. As set forth in step 76, before the grant of a patent, an entity may receive a request generated by process circuitry in the system 10 regarding the filing of continuing applications (e.g., divisionals, continuations, continuation in parts, etc.) in an attempt to protect additional intellectual property. Typically, the decision as to whether to file continuing applications is made by the owning entity, the controlling agent, the drafting agent or the like upon notice of allowance or other triggering events. If the decision is to file a continuing application, the decision is entered into the system and/or into any of the types of software as described above and communicated to the agent responsible for filing. The communication can be, for example, an automated process that happens when certain conditions are met or by simple key strokes or other commands in the system or it can be by giving the agents access to the database. One skilled in the art would also recognize that decisions about continuing applications could be communicated independently of the system of the invention. The agent responsible for filing acts upon the decision and either enters information about the continuing application and further prosecution (as described above) into the system and/or software as described above or has it entered by one of the above entities as described above.

In another embodiment of the invention, upon acceptance of any claims by the controlling agent, a divisional process circuitry can be executed to automatically or manually generate a request to the controlling agent for a decision on whether a divisional or continuing application should be filed as set forth in step 76 and if such an application is to be filed, information relating to the claims that should be filed in the continuing application. Information such as the decision of the controlling agent and any claims to be filed are entered and stored in the divisional process circuitry. If necessary, the translation process circuitry 18 can then be executed to automatically or manually generate instructions to a translation supplier 48 to provide any necessary translation of the claims. The foreign filing decision process circuitry 20 can then be executed to automatically or manually generate an instruction to the administrative or technical agent to file a continuing or divisional application which includes the applicable information relating to the claims to be filed. Thereafter, the same process circuitries can be executed to automatically or manually generate the instructions to perform the necessary administrative and technical tasks as set forth above. One skilled in the art would recognize that the decision on whether to file a continuing or divisional application could be performed independently of the system of the invention.

Other potentials in the life of patents are post grant proceedings such as oppositions, reissues, reexaminations, litigations and the like. Typically, the decision as to whether (if the action is optional) and/or how to proceed is made by the owning entity, the controlling agent, the drafting agent, a designee or the like upon notice of the event. If the decision is to proceed with one or more of the above, the decision is entered into the system and/or into any of the software as described above and communicated to the agent responsible for handling the activity. The communication can be, for example, an automated process that happens upon the existence of certain conditions or by simple key strokes or other commands in the database or it can be by giving the agents access to the database. One skilled in the art would also recognize that decisions about such activities could be communicated independently of the system of the invention. The agent responsible for handling the activity acts upon the instruction and continues to either enter updated information about the activity into the software or has it entered by one of the above entities as described above until the matter is resolved.

Another embodiment of the invention involves validation of patents from regional patent offices (such as the EPO) in the desired national patent offices. Typically, the decision as to whether to validate and where is made by the owning entity, the controlling agent, the drafting agent or the like upon notice of grant. If the decision is to proceed with validation, the decision is entered into the system 10 and/or into any of the software as described above. The grant notification process circuitry 26 is executed to communicate an instruction to an administrative or technical agent or agents responsible for validation and any necessary translation providers as set forth in step 78. The communication can be, for example, an automated process that happens when certain conditions are met, or by simple key strokes or other commands in the database or it can be by giving the agents access to the database. One skilled in the art would also recognize that decisions about validation could be communicated independently of the system of the invention. The agent responsible for handling the validation and any necessary translation providers act upon the instruction and enter the resultant validation information into the software or have it entered by one of the above entities as described above.

In another embodiment of the invention, if the application is granted by a regional patent office such as the EPO, a European Patent Office validation process circuitry may be utilized to effect validation of the claims granted by the European Patent Office in contracting countries to the European Patent Office. In this case, the translation process circuitry could be executed to automatically or manually generate instructions to a translation supplier to provide any necessary translations of the claims as shown in step 48. Information such as countries for validation and translated claims could be entered into the system and the European Patent Office validation process circuitry could be further executed to automatically or manually generate a filing instruction to an administrative European Patent Office agent to file the translated claims and/or validate the granted EPO patent application as set forth in step 78. This instruction may also include a fee instruction limiting the amount that the European Patent Office agent could charge for such filing services. The European Patent Office validation process circuitry can also be executed to automatically or manually generate instructions to administrative agents in European Patent Office contracting countries to validate the granted application in their local patent office. These validation instructions may include a fee instruction limiting the agents in the contracting countries to an amount they can charge for such validation services. Note, the above translation and validation instruction may also be provided to an LPO service specialized in validation of European patent applications such as those provided by Valipat located at 7 Rue de Livourne, Brussels, Belgium, RWS Group located at Europa House Chiltern Park, Chiltern Hill Chalfont St Peter, Buckinghamshire SL9 9FG United Kingdom England, and Marks & Clerk Luxembourg located at 44 Rue de la Vallée, L-2661, Luxembourg, and the like. In one embodiment, the above validation process circuitry automatically or manually generates a validation instruction prior to a deadline date calculated by the docketing process circuitry. One skilled in the art would also recognize that the validation process instructions could be performed independently of the system of the invention.

As described above, the system of the invention enables a controlling agent to more efficiently manage the cost of various tasks required throughout the life cycle of an intellectual property asset. As such, an advantage of this system is that the nature of numerous and different tasks required in a variety of intellectual property offices throughout the world can be identified within the system 10 as administrative or technical so that a user of the system 10, such as a controlling agent, can readily select an appropriate agent to complete the task at hand. In other words, the system 10 of the invention provides a mechanism for the controlling agent to have a choice to select from lower priced administrative agents entered within the system to perform administrative tasks or a choice to select from higher priced technical agents entered within the system to perform more technical tasks. The controlling agent no longer has to rely upon a high priced technical agent for all or a majority of services simply because the controlling agent does not understand the nature of the task, or worse yet because the technical agent has misled the controlling agent to believe the task is technical in nature when it is not.

Furthermore, the system 10 of the invention enables a controlling agent to select from multiple administrative agents and multiple technical agents. Again, an advantage of this system is that the nature of numerous and different tasks required in intellectual property offices throughout the world can be identified in the system as administrative and a variety of administrative agent options can be provided for the controlling agent to use. The system 10 can be configured to allow a controlling agent to select the desired administrative agent each time a task is required, or the system can be configured to automatically use a particular agent for a particular task as needed. With either configuration, the instructions are generated by the system 10 and communicated to the applicable agent as described above. Obviously administrative agent and technical agent information must be entered into the system 10, which may include agent names, contact information, pricing, tasks performed, etc.

In another embodiment of the invention, the system 10 can be provided and maintained by a supplier that coordinates or provides administrative agents for all or most of the administrative tasks required by the controlling agent. In this system the controlling agent can rely upon a single service provider to efficiently manage all administrative tasks throughout the intellectual property life cycle, however, for tasks of a technical nature, the controlling agent still has the flexibility to utilize technical agents that have long standing relationships with the controlling agent and/or have technical experience to provide quality service in the technology being managed by the controlling agent.

With multiple agents providing services on the same intellectual property asset, power of attorney documents must be filed and withdrawn as required by intellectual property offices in each jurisdiction. As such, power of attorney forms can be stored in the system 10 such that applicable agent data and the intellectual property owning entity data can be populated in applicable power of attorney and withdrawal of power of attorney forms. The system 10 can be configured to execute a process circuitry to automatically or manually generate such forms and provide them to an applicable the agent for filing, or if possible electronically file them in the applicable intellectual property office.

Since the cost data relating to charges by a variety of agents for both administrative and technical tasks is received and stored by the e-billing process circuitry 30 of the system, charges by agents for such tasks can be summed and compared to a variety of criteria. For example, charges by an agent for a task can be compared to another agent, or to a pre-established target for such a task, or to a specific budget assigned to such a task by the controlling agent or the intellectual property asset owning entity. The e-billing process circuitry 30 can be used to generate reports showing such comparisons, which can be used by a user of the system to determine the most cost efficient agent for a particular task.

Alternatively, fixed fees can be established for all administrative tasks managed by the system 10 and the system can generate invoices to the applicable entity for all administrative services performed. The system can also be configured such that fixed fees are assigned to all technical tasks managed by the system and an invoicing process circuitry can be executed by the system 10 to generate invoices to the applicable entity for all technical services performed. In addition, the system of the invention could be configured to make payments to both administrative and technical agents providing such services.

In yet another aspect of the system 10 of the invention, administrative and technical agent can submit bids on tasks identified in the system 10. Bids can be submitted in a file or in writing for entry into the system 10 or by submitting them directly into the system 10 via an online access portal. The e-billing process circuitry can then be executed to receive and compare the bids, and report the results of such bids to the owning entity, a controlling agent, a designee, or the like.

Another embodiment of the invention includes an invoicing process circuitry that can be executed to generate invoices to a drafting agent, a controlling agent, an administrative agent, a technical agent and/or the owning entity for some or all services and/or fees. The invoicing process circuitry can be executed to receive and store information such as countries, agents providing services, agent charges, patent offices, patent office fees, and the like for some or all of the fees and services. These invoice charges may include the fees provided by the system 10 in the fee instructions to the agents. The invoicing process circuitry can also be executed to automatically or manually generate a report of the amount saved by using the system of the present invention versus using a technically qualified agent for all services. The invoicing process circuitry can also be executed to automatically or manually generate due dates for invoices and to generate reports showing payments due and/or overdue. One skilled in the art would also recognize that the invoice processing could be performed independently of the system of the invention.

Another embodiment of the invention comprises an agent payment process circuitry. The agent payment process circuitry receives and stores charges by agents for performing services. When executed, the agent payment process circuitry automatically or manually generates a payment report showing the amount due to an agent for services rendered during a selected time period, consistent with fee agreements or with the fee instructions provided to such agents by the system of the present invention and, if desired, automatically effectuate the payment. If desired, the maximum payment the system will generate can be limited to the amount provided in the fee instruction. In another embodiment, the system will automatically pay the amount agreed once completion of a service is entered into the system.

In another embodiment of the invention, the system 10 is used to provide cost estimates when various decisions are made in the IP lifecycle. For example, when the owning entity is deciding on the international filing plan for an application, the system 10 can provide estimates of the cost of protection in each country, which can be broken down by administrative tasks and substantive, technical tasks. Similarly, at each decision point in the IP lifecycle, the system 10 can provide estimates of what each decision will mean in terms of cost, and/or cost for the remainder of the patent and/or application life. This can be facilitated, and the cost lowered, by adopting a flat fixed fee for the administrative tasks and/or establishing a budget and/or alternative billing arrangements for the technical tasks.

The system 10 of the invention can be administered by the owning entity, the controlling agent, or a service provider who provides the system as well as a network of administrative agents to provide the administrative services at fixed administrative charges or low rates. Technical agents are typically selected by the owning entity, the controlling agent, the drafting agent or the like. However, they too may be provided by a service provider operating the system of the present invention. By use of this process and/or system 10 of the invention, many of the internal processes and administrative staff of an entity owing and actively acquiring intellectual property can be outsourced through, for example, a legal process outsourcing service (LPO). Access to the system can be provided to the entities owning intellectual property as well as the agents and/or a legal process outsourcing service such that at least a portion of all docketing services, foreign filing services and invoice processing can be provided by the agents and/or the legal process outsourcing company, while the owning entities can simply access the docking, foreign filing and cost information without having to enter or maintain such information.

As an example, an organization such as a corporation or a law firm could hire a LPO service in combination with the system 10 of the present invention. The LPO could manage the system at each step or decision in the lifecycle or, if desired, only a subset thereof. Moreover, the LPO could input data into and extract data out of the system or only a subset thereof. The other entities involved in the life cycle such as the owning entity, the controlling agent, the drafting agent, administrative agents, technical agents and the like could be provided access to the system for receiving instructions and updates and, if desired, entering data related to activities they are working on. In this example, the LPO could be represented by controlling administrators which function as the owning entity's internal docketing, invoice processing and international filing staff.

As an example, the LPO could be involved in all of the following activities, which are administrative tasks, or only a desired subset thereof:

Entry of information related to an invention;

Entry of information rated to a novelty search conducted on the invention;

Entry of information related to the priority application filing(s) covering the invention and any prosecution related thereto;

Entry of information related to the translation and international filings of applications based on the priority filing(s) and prosecution related thereto;

Entry of information related to requesting examination in countries requiring such action;

Entry of information related to requesting use of the patent prosecution highway;

Entry of information related to payment of grant fees;

Entry of information related to the validation of a granted application in a regional patent office;

Entry of information related to payment of annuities; and

Entry of information related to the receipt, processing and payment of invoices.

As is evident from the above, if the LPO method and system 10 of the invention are used, much of an organization's docketing, invoice processing and/or foreign filing departments can be outsourced. Other advantages can also be gained by such outsourcing. For example, a common file numbering system can be used in and/or across organizations such that the amount and complexity of docketing can be reduced and simplified.

The present invention can be provided on a web based system where the status of the application can be viewed by one or more of the owning entity, the drafting agent, the controlling agent, the administrative agent, the technical agent, a designee and/or other parties involved in the processing of the application. In a web based system, a security system is required to protect the confidentiality of the information stored in the system and segregate the information by intellectual property owning entity. By providing a web based system, any instructions and actions required to be taken in any countries could be reviewed by any agent assigned to a particular patent application via the docketing process circuitry. Similarly those involved in the processing of the application, such as any of the agents, can provide relevant input and updates as assigned. Likewise, when assigned, any of the agents can access the system via the web to request others involved in the processing of the invention to perform actions due. The docketing process circuitry 29 can automatically or manually generate an instruction to the respective agent(s), requesting completion of the applicable task.

The method and system of the invention can be used to manage the cost and quality of related international patent applications. To accomplish this, each of the above described process circuitries can be included in the system 10. Alternatively, a user can select any one or more of the process circuitries to be included in the system as determined by the facts and circumstances of the user. For example, in one embodiment of the invention, the system uses all of the above process circuitries. In another embodiment of the invention, the system uses the process circuitries from after the filing of the international applications through the payment of the grant fee. In another embodiment of the invention, the system uses the process circuitries from after the filing of the international applications through the payment of the annuity fees.

In another embodiment, the present invention is a method of controlling the cost of acquiring international IP protection. The method includes first determining which tasks in the process of acquiring international IP protection are administrative and which are technical. Next, at least one of the administrative tasks is assigned to an administrative agent. In this method, the administrative tasks are selected from a group comprising conducting a patent search, entering docketing data relating to said patent application, generating reports of docketing data relating to said patent application, processing invoice data relating to said patent application, requesting examination, filing an information disclosure statement, paying any official fee, proofreading the patent application, reporting correspondence, filing a patent prosecution highway request, filing an assignment, filing a declaration, preparing copies, preparing a form, preparing a translation and filing a patent application. Moreover, this invention can be used to assist with the legal process outsourcing of certain functions in, or the entirety of, administrative functions of an in-house IP department or law firm. For example, the system can be used to facilitate the filing of applications, the international filing of applications in a cost effective manner as described above, docketing actions on the applications, invoicing, payment of fees such as those described above and/or continuing annuity payments.

The above described system and method offers advantages over existing systems, including that it provides a comprehensive intellectual property management solution for obtaining and paying for services relating to intellectual property assets. The solution enables users to readily select the most efficient means for performing various tasks required in the international intellectual property life cycle. Administrative and technical agents are instructed by the system to perform tasks at a cost structure that is commensurate with the task at hand. Information and data relating to the intellectual property asset, the tasks being performed, charges associated with such tasks as well as instructions and deadline dates for the tasks are calculated and/or entered into the system. The system utilizes this information and data to manage tasks throughout the life cycle of an intellectual property asset, enabling a user to easily manage an intellectual property asset without duplicate effort or excessive cost.

It is to be understood that variations and modifications can be made on the aforementioned without departing from the concepts of the present invention, and further it is to be understood that such concepts are intended to be covered by the following claims unless these claims by their language expressly state otherwise.

What is claimed is:

1. A computer system for controlling the cost of services during the life cycle of a patent application comprising a computer having a microprocessor and memory components for executing at least one process circuitry and for storing data relating to said patent application, including a priority date for said patent application, said at least one process circuitry being executable to store and utilize administrative agent data relating to a plurality of administrative agents and said at least one process circuitry being executable to store and utilize technical agent data relating to a plurality of technical agents, said at least one process circuitry executable to store and utilize a controlling agent's choices of selected administrative agents from said plurality of said administrative agents and said at least one process circuitry executable to store and utilize a controlling agent's choices of selected technical agents from said plurality of said technical agents, said at least one process circuitry being executable to store and utilize a plurality of administrative instructions relating to a plurality of administrative tasks to be performed during the life cycle of said patent application and a plurality of technical instructions relating to a plurality of technical tasks to be performed during the life cycle of said patent application, said at least one process circuitry being executable to communicate at least one of said administrative instructions to one of said selected administrative agents instructing said one selected administrative agent to perform one of said administrative tasks relating to said patent application and further being executable to communicate at least one of said technical instructions to one of said selected technical agents instructing said one technical agent to perform one of said technical tasks relating to said patent application.

2. The computer system of claim 1, wherein said at least one process circuitry includes an e-billing process circuitry that receives and stores invoice data relating to said patent application from said plurality of administrative agents and said plurality of technical agents.

3. The computer system of claim 1, wherein said plurality of administrative tasks is at least one of a group comprising conducting a patent search, filing a patent application, requesting examination, filing an information disclosure statement, filing a patent prosecution highway request, proofreading the patent application, reporting correspondence, filing an assignment, filing a declaration, preparing copies, preparing a form, preparing a translation, validating of patents in contracting countries to a regional patent office, paying any official fee and paying an annuity.

4. The computer system of claim 3, wherein said administrative task is preparing a translation.

5. The computer system of claim 1, wherein said plurality of technical tasks is at least one of a group comprising drafting the patent application, analyzing prior art relating to the patent application and responding to office actions relating to the patent application.

6. The computer system of claim 1, wherein said at least one process circuitry includes a docketing process circuitry that receives and stores patent application data relating to said patent application, including a priority date and a grant date, said docketing process circuitry calculating deadline dates relating to said patent application.

7. The computer system of claim 1, wherein said at least one process circuitry includes a foreign filing decision process circuitry that generates a foreign filing decision request in advance of a deadline date for foreign filing, said decision request including data relating to said patent application, said foreign filing decision process circuitry receives and stores foreign filing decision countries and generates a foreign filing instruction to a filing agent.

8. The computer system of claim 1, wherein said at least one process circuitry includes a grant notification process circuitry that receives and stores grant data relating to said patent application, including a first grant country and a first granted claim, said grant notification process circuitry generating a PPH instruction to a PPH agent in at least one foreign filing decision country, said instruction including said first granted claim and said first grant country, said at least one process circuitry further includes a PPH response process circuitry that receives and stores response data relating to an intellectual property office response to a PPH request filed by said PPH agent in said foreign filing decision country, said PPH response process circuitry generating an instruction including at least a portion of said response data.

9. The computer system of claim 1, wherein said at least one process circuitry includes an annuity payment process circuitry that generates an annuity fee payment instruction in advance of an annuity fee payment deadline date for paying said annuity fee, said payment instruction including data relating to said patent application.

10. A method for managing costs over the life cycle of a patent application comprising the steps of:
   a. providing a system for storing data relating to said patent application, including a priority date for said patent application;
   b. defining a plurality of administrative tasks that may be required during said life cycle of said patent application;
   c. entering administrative agent data into said system relating to a plurality of administrative agents;
   d. relating said administrative agent data to at least one of said plurality of administrative tasks that said plurality of administrative agents is capable of completing;
   e. defining a plurality of technical tasks that may be required during said life cycle of said patent application;
   f. entering technical agent data into said system relating to a plurality of technical agents;
   g. relating said technical agent data to at least one of said plurality of technical tasks that said plurality of technical agents is capable of completing;
   h. selecting at least one of said administrative agents for completing at least one of said administrative tasks for said patent application;
   i. selecting at least one of said technical agents for completing at least one of said technical tasks for said patent application;
   j. generating at least one administrative instruction to said at least one administrative agent to perform said at least one administrative task; and
   k. generating at least one technical instruction to said at least one technical agent to perform said at least one technical task.

11. The method of claim 10, wherein a further step comprises establishing a cost structure for said at least one administrative task and entering cost data relating to said price structure into said system.

12. The method of claim 10, wherein a further step comprises entering invoice data relating to said patent application from said plurality of administrative agents or said plurality of technical agents.

13. The method of claim 10, wherein said step of defining said plurality of administrative tasks that may be required during said life cycle of said patent application is at least one of a group of steps comprising conducting a patent search, entering docketing data relating to said patent application, generating reports of docketing data relating to said patent application, processing invoice data relating to said patent application, requesting examination, filing an information disclosure statement, paying any official fee, proofreading the patent application, reporting correspondence, filing a patent prosecution highway request, filing an assignment, filing a declaration, preparing copies, preparing a form, preparing a translation and filing a patent application.

14. The method of claim 10, wherein the administrative task is preparing a translation.

15. The method of claim 10, wherein a further step comprises providing a designee of an owning entity of said patent application an opportunity to select multiple administrative agents from said plurality of administrative agents to perform said administrative tasks.

* * * * *